Patented Aug. 4, 1931

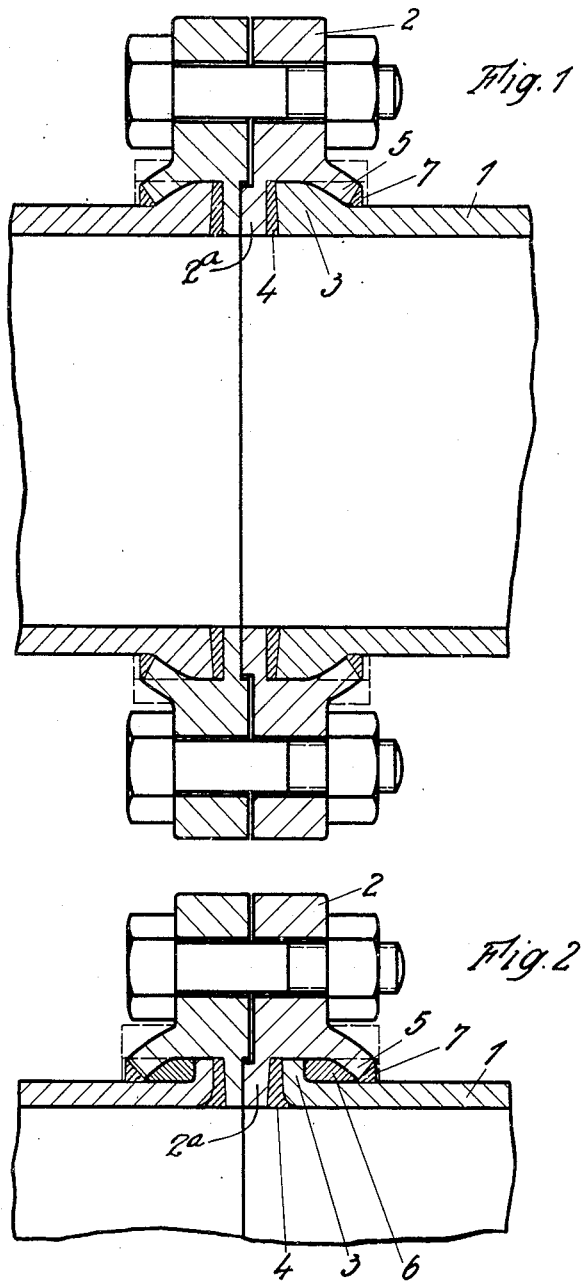

1,817,289

UNITED STATES PATENT OFFICE

CARL BENZ, OF BIESDORF, NEAR BERLIN, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

FLANGED COUPLING FOR CONDUITS

Application filed June 27, 1929, Serial No. 374,213, and in Germany April 17, 1929.

My invention relates to improvements in flanged couplings for conduits.

For various reasons conduit tubing is frequently made with attached flanges for joining the lengths together, said flanges being secured on the tubes by various means, such for example, as by rolling. No high claims as regards strength can, of course, be made on such joints. Another proposal suggests the riveting of flanges provided with rims to the ends of the tubes. This causes a considerable weakening of the material of the tubes. Simply welding the flange to the end of the tube is not satisfactory, as welds must not be subjected to strains.

The above difficulties are effectively eliminated according to my invention by having a weld serve merely for ensuring a good seal while providing other means for bearing the strains and stresses.

In reducing my invention to practice the end of the tube to be provided with a flange may, for instance, be reinforced or thickened to form a peripheral protuberance and a rim on the coupling flange may be so displaced that it fits over the reinforced end of the tube. The reinforcement of the end of the tube may be effected in various ways. In most cases upsetting of the end of the tube is sufficient. Where the tubes are manufactured by the tube rolling process, pilger roll or Perrins process, and if conditions permit, the reinforcement may be machined out of the remaining head. If the tube is of uniform thickness throughout and upsetting is to be avoided the end of the tube may be turned up. Since the rim produced in this way does not suffice to secure the flange steadily enough, a special additional ring is placed against the turned up edge of the tube and the rear edge of this auxiliary ring is then engaged by the turned down rim of the coupling flange.

Two embodiments of my invention are illustrated in the attached drawings by way of example and described in my specification.

In the drawings

Fig. 1 represents a longitudinal section through a flanged coupling on a tube with reinforced end, and Fig. 2 represents a longitudinal section through a flanged coupling on a tube with turned up edge.

Like parts are indicated by like letters of reference in both figures of the drawings.

Referring to Fig. 1 of the drawings, it will be seen that the tube 1 is provided with a reinforced or thickened end produced by upsetting in such a way as to form a protuberant boss. A coupling flange 2 is joined to the thickened end 3 of the tube 1 preferably, by providing the coupling flange with an integral annular portion 2a between which and the end face of the thickened end portion 3 is interposed a welded seam 4. The coupling flange 2 is provided with a rim 5, which may be displaced from an original position shown in dotted lines or otherwise deformed so that it engages or folds over the thickened end portion 3 of the tube and thus avoids stress or strain on the welded seam or weld 4. This joint has the advantage that the welded seam is reinforced, by providing considerable increase in the surfaces which are welded together. If desired the flange rim 5 may likewise be joined to the thickened end 3 of the tube 1 by a seam 7.

In Fig. 2 of the drawings is shown a flanged coupling for conduit tubing which is substantially similar to that shown in Fig. 1 except that the protuberance on tube 1 is provided in the form of an out-turned flange 3 at the end of said tube. Against the rear face of the rim 3 formed in this way is placed a ring 6 and this ring is engaged or gripped by the turned down flange rim 5 of the coupling flange 2. As in the case illustrated in Fig. 1, the flange 2 may also be provided with an annular portion 2a which may be joined to the broadened tube end 3 by an enlarged seam or weld 4 which is thus placed between surfaces having a larger area than the cross-section of the tube.

Various modifications and changes may be made without departing from the spirit and the scope of the invention, and I desire, therefore, that only such limitations shall be placed thereon as are imposed by the prior art.

I claim as my invention:

1. In a flanged coupling for conduit in combination, a tube with a rim formed by turning the end of the tube over, a ring abutting against said rim, a flange, a welded seam between the face of the tube end and said flange, and a rim on said flange fitting over said ring.

2. In a flanged coupling for conduit in combination, a tube with a rim formed by turning the end of the tube over, a ring abutting against said rim, a flange, a welded seam between the face of the tube end and said flange, a rim on said flange fitting over said ring, and a welded seam between said rim and the outer wall of the tube.

3. In a flanged coupling for conduits, the combination of a tube with an enlarged end, a coupling flange interlocked with said enlarged end and provided with an inwardly-presented annular portion arranged opposite to the end face of said tube, and a welded seam between said end face of the tube and said annular portion of the coupling flange.

4. A flanged coupling for conduits as recited in claim 3, in which said coupling flange is provided with a rim interengaging with said enlarged end of the tube.

5. In a flanged coupling for conduits, a tube with a peripherally protuberant end, a coupling flange provided with an inwardly-presented annular portion arranged opposite to the end face of said peripherally protuberant end of the tube and with a rim interengaging with said protuberant end of the tube, and a welded seam interposed between said rim and the outer wall of the tube.

6. In a flanged coupling for conduits, a tube provided with an outwardly-presented end flange, a coupling flange provided with integral portions between which said end flange projects, and a welded seam interposed between the end face of said tube and one of said integral portions of the coupling flange.

7. In a device of the character described, the combination with a pipe-section provided with a circumferential protuberance at one end, of a coupling flange rigidly mounted on said protuberance and interlocked therewith to prevent relative axial displacement, and a welded seam between the end face of said pipe-section and said coupling flange.

In testimony whereof I affix my signature.

CARL BENZ.